M. E. PIERSON.
MACHINE FOR MAKING FILAMENT SUPPORTING STEMS.
APPLICATION FILED DEC. 18, 1909.
1,004,072.
Patented Sept. 26, 1911.
5 SHEETS—SHEET 1.
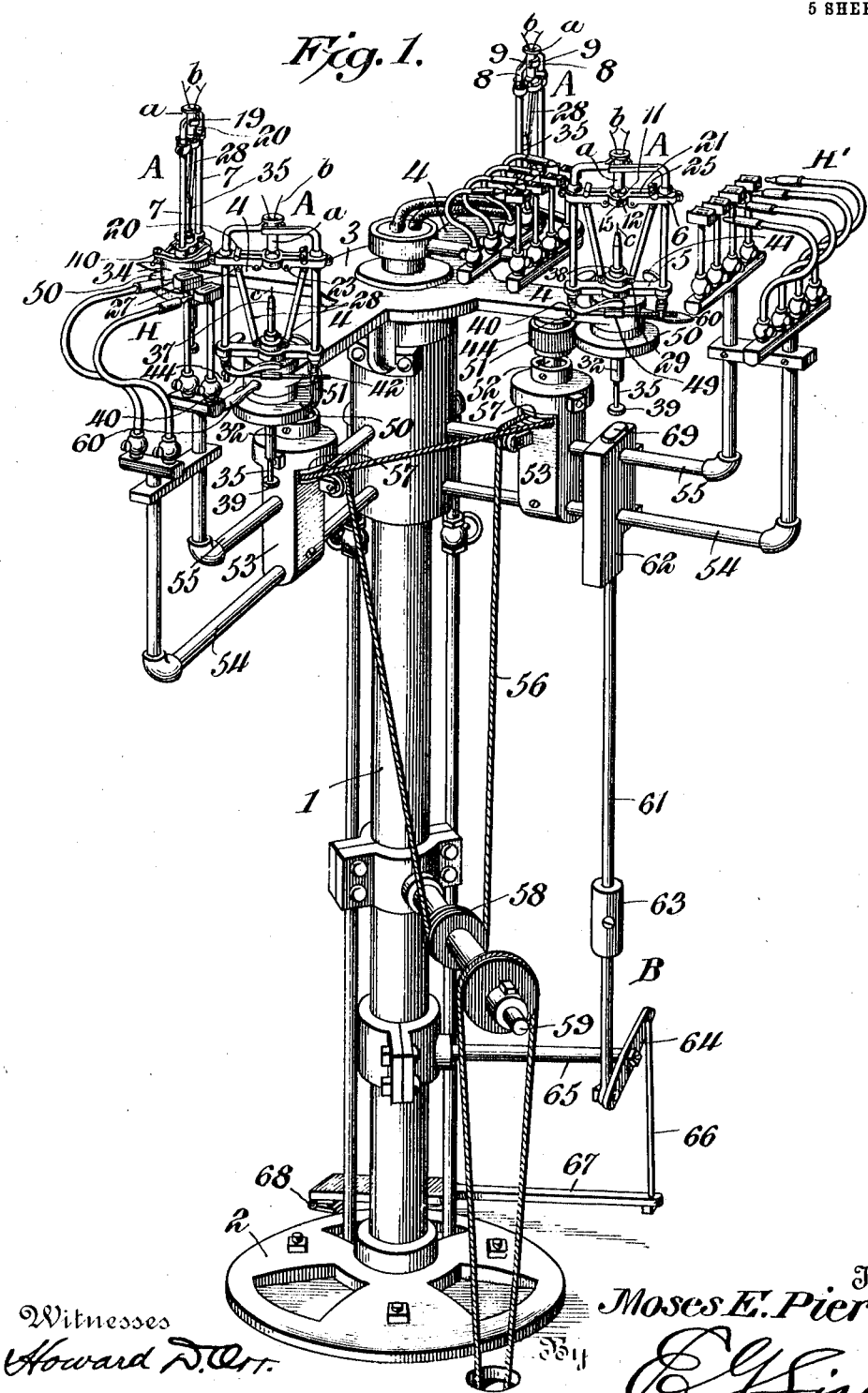

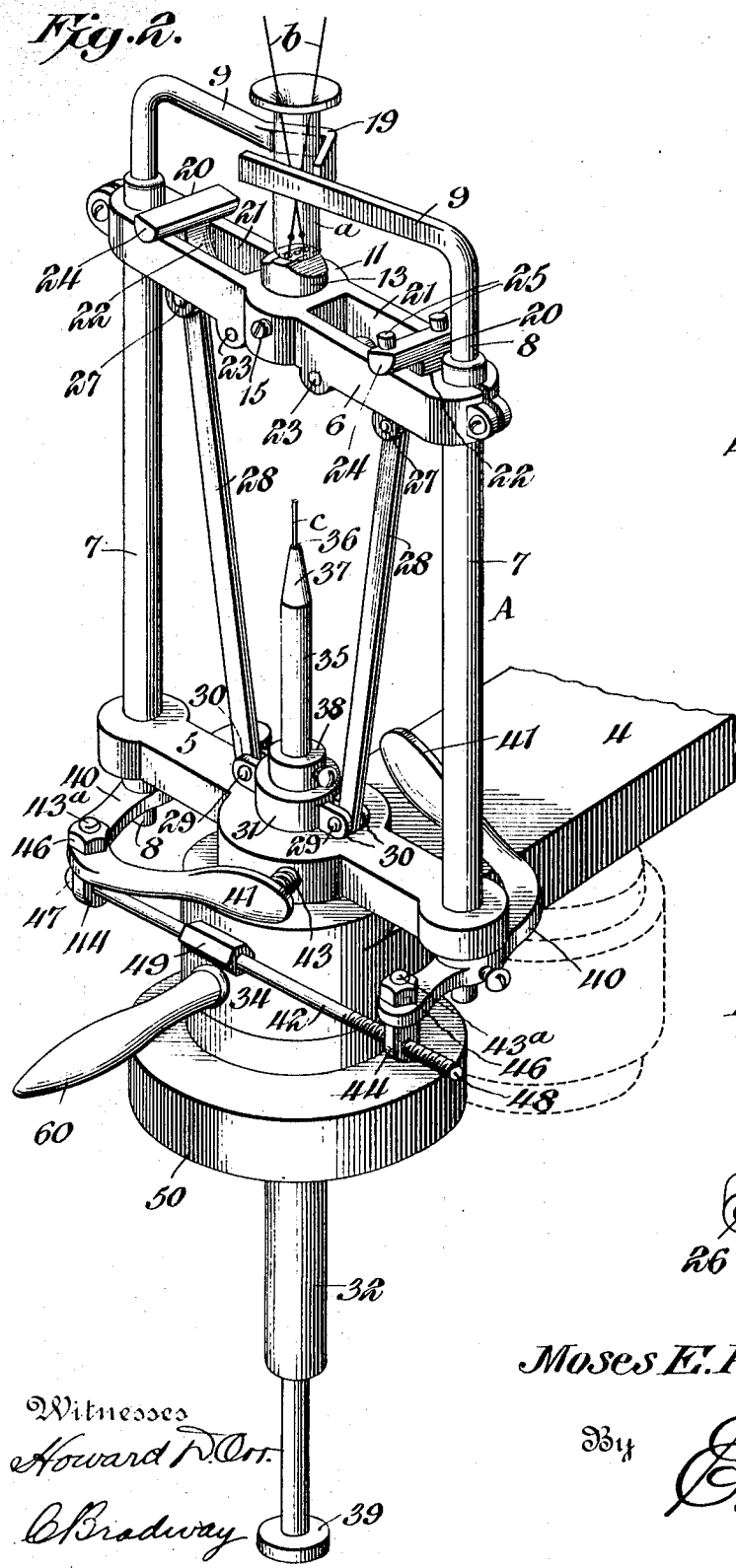

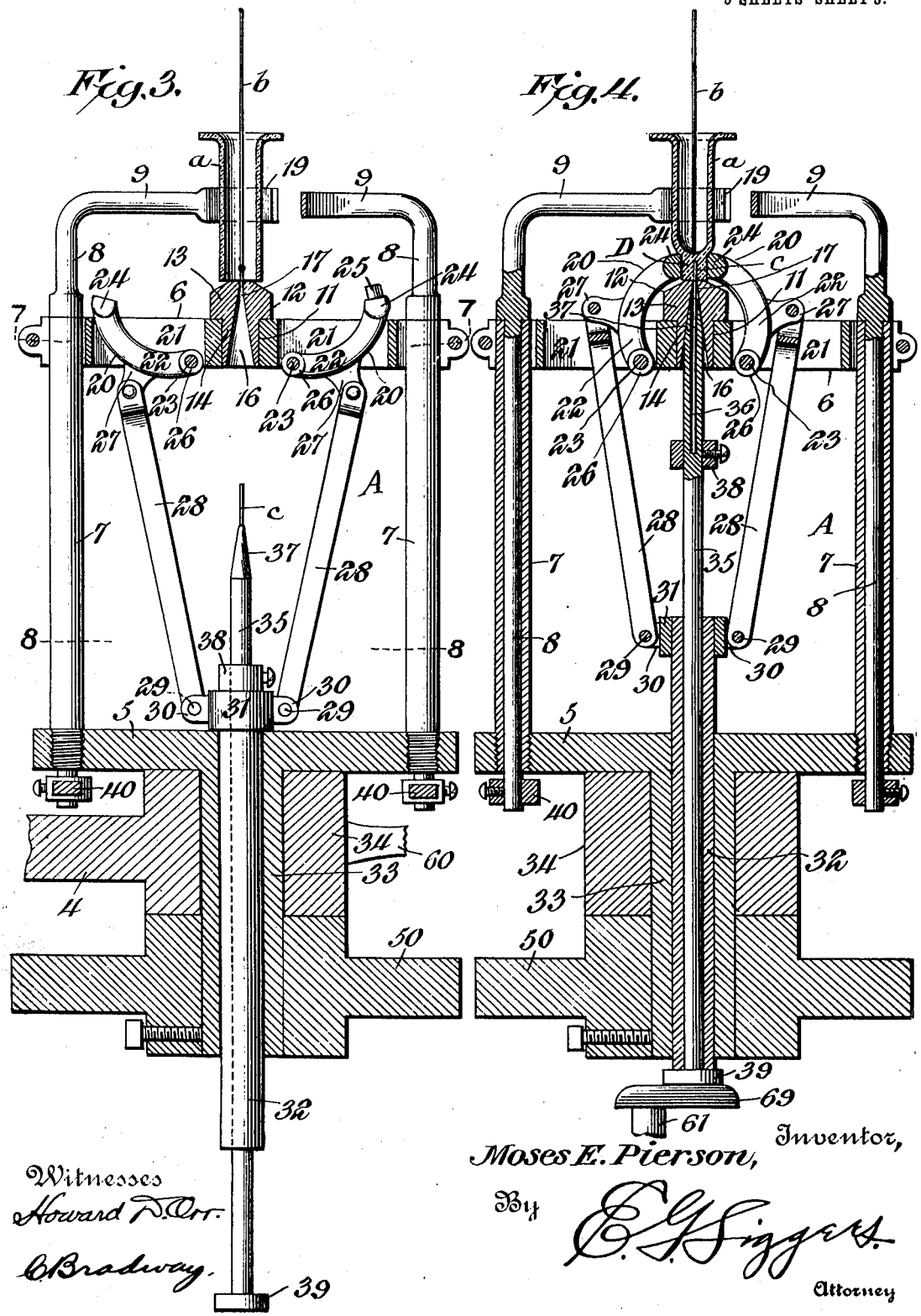

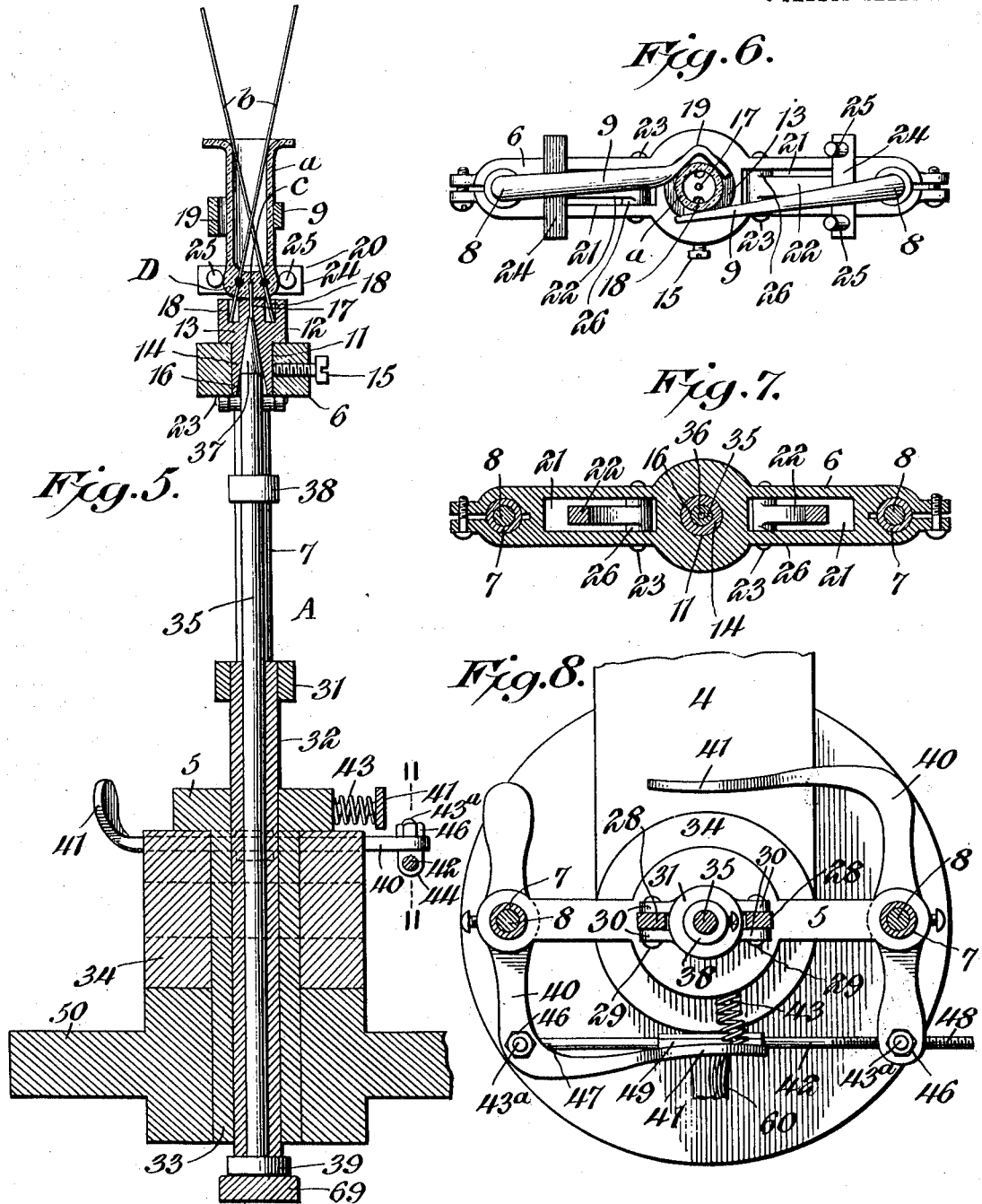

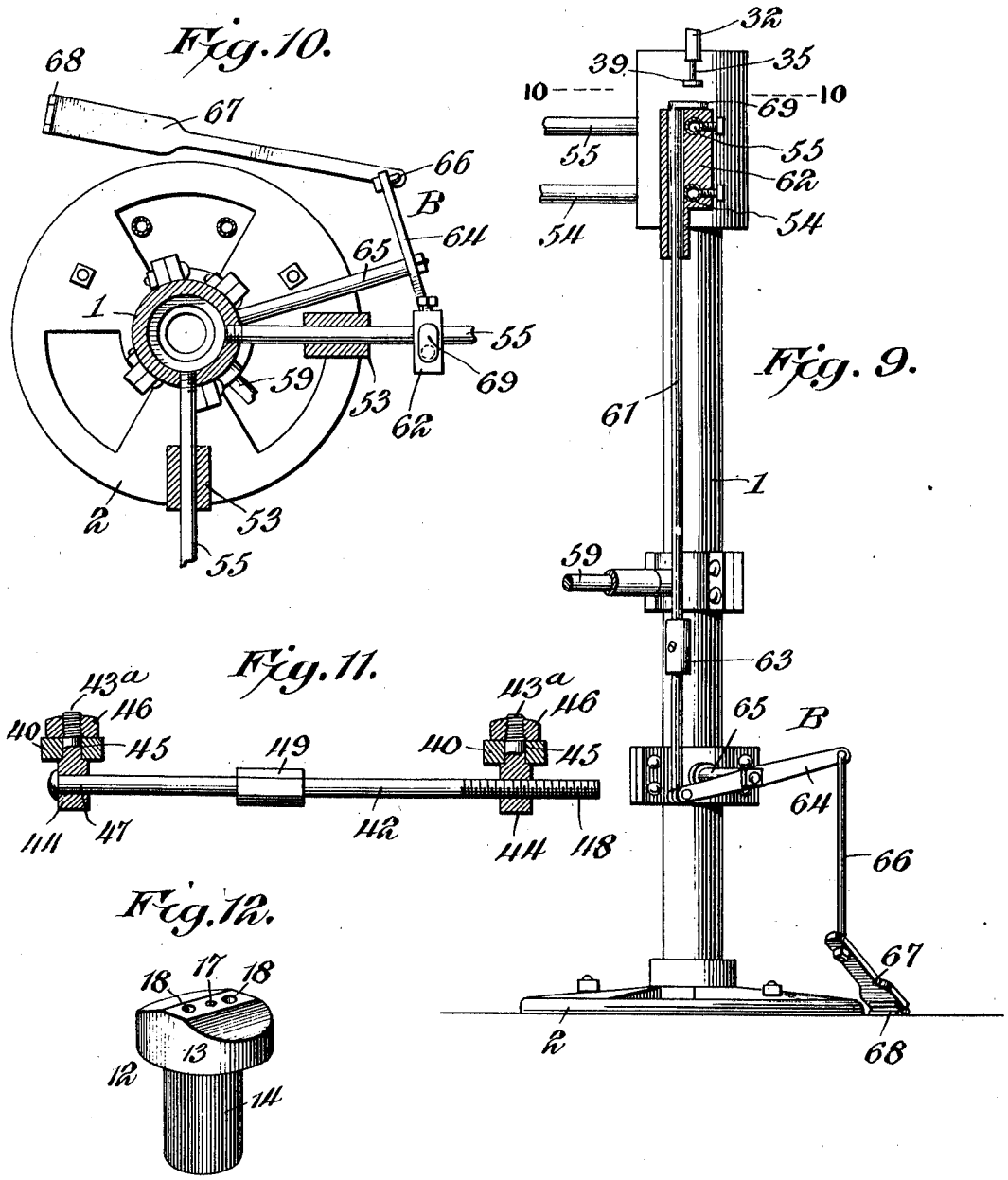

UNITED STATES PATENT OFFICE.

MOSES E. PIERSON, OF EMPORIUM, PENNSYLVANIA, ASSIGNOR TO NOVELTY INCANDESCENT LAMP COMPANY, OF EMPORIUM, PENNSYLVANIA, A CORPORATION OF PENNSYLVANIA.

MACHINE FOR MAKING FILAMENT-SUPPORTING STEMS.

1,004,072. Specification of Letters Patent. Patented Sept. 26, 1911.

Application filed December 18, 1909. Serial No. 533,847.

*To all whom it may concern:*

Be it known that I, MOSES E. PIERSON, a citizen of the United States, residing at Emporium, in the county of Cameron and State of Pennsylvania, have invented a new and useful Machine for Making Filament-Supporting Stems, of which the following is a specification.

This invention relates to a machine for making filament-supporting stems for incandescent electric lamps.

The invention has for one of its objects to improve and simplify the construction and operation of machines of this character so as to be reliable and efficient in use, readily manipulated, and so designed that a single attendant can operate the machine to produce a large number of stems with great precision and despatch.

Another object of the invention is the provision of a machine of that type including a rotary carrier or spider frame provided with a plurality of heads which receive the parts of the stem and operate on them to produce the finished article through the agency of novelly arranged instrumentalities, so that the attendant has only to assemble the parts of the stem, bring them into coöperative relation with the heaters, press or seal the fused end of the stem, and finally remove the finished article.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a perspective view of the machine. Fig. 2 is an enlarged perspective view of one of the stem-forming heads. Fig. 3 is a vertical section of one of the heads showing the stem flare and leading-in wires in assembled position. Fig. 4 is a similar view, showing the parts thereof in the position they assume when the stem is completed. Fig. 5 is a vertical section taken through the head at right angles to the section of Fig. 4. Fig. 6 is a plan view of the upper portion of the head. Fig. 7 is a horizontal section on line 7—7, Fig. 3. Fig. 8 is a horizontal section of the head on line 8—8, Fig. 3. Fig. 9 is a fragmentary view, showing the treadle mechanism for elevating the anchor wire holder. Fig. 10 is a horizontal section on line 10—10, Fig. 9. Fig. 11 is a detail sectional view of the device for causing the flare-gripping jaws of the head to operate in unison, the section being taken on line 11—11, Fig. 5. Fig. 12 is a perspective view of the tube or flare-holding seat. Fig. 13 is a perspective view of one of the jaw-operating levers. Fig. 14 is a perspective view of one of the jaws for compressing the melted end of the flare or tube closed on the leading-in and anchor wires. Fig. 15 is a perspective view of the finished filament-supporting stem.

Similar reference characters are employed to designate corresponding parts throughout the views.

At the outset, it will be remarked that the novelty in the present invention resides in the construction of the stem-forming head and the means for operating the anchor wire holders, all the rest of the machine forming the subject-matter of my co-pending application, Serial No. 533,047, filed December 14, 1909.

Referring to the drawing, and more particularly to Fig. 1, 1 designates the supporting column or standard of the machine which is secured to the floor by a base 2 and carries at its upper end a rotatable spider-shaped frame or carrier 3 which has, in the present instance, four radial arms 4 that are provided at their extremities with rotary stem-forming heads A which receive the parts that constitute the stem and are adapted to carry the assembled parts successively in front of the preliminary heater H and the final heater H' so as to melt the glass tube or flare to permit the wires to be sealed in place, the said heads being rotated only while they are opposite the heaters, as will be described hereinafter more in detail.

Each head A consists of a frame composed of a base member or cross piece 5, a top member or cross piece 6 connected rigidly together by tubular standards 7 which have their upper and lower ends fastened in the ends of the top and bottom cross members. Extending vertically through the standards are rock shafts 8 that carry at their upper ends horizontal jaws 9 which extend inwardly over the top cross piece 6 of the frame for the purpose of gripping the flare or glass tube $a$ of which the stem is made. Immediately under the jaws and arranged in a vertical centrally-disposed opening 11 in the top cross piece 6 is a seat 12 in the form of a headed plug, the head 13 of which is adapted to receive the lower end of the flare, as clearly shown in Fig. 2. The shank portion 14 of the seat fits in the opening 11 and is held therein by a set screw 15, and by this means the seat can be raised or lowered to support the flare in proper relation to the fusing flames of the heaters. The body of the seat 12 has an upwardly-tapering or conical bore 16 which terminates at the top face of the seat in an opening 17 through which the achor wire is inserted into the glass tube or flare of the stem, and spaced from this opening 17 are sockets 18 for receiving the platinum-tipped ends of the leading-in wires, as clearly shown in Figs. 2 and 5. The jaws 9 are so constructed as to grip the flare $a$ at three points so as to thereby insure a firm hold, and for this purpose, the extremity of one of the jaws is straight and the other is provided with a V-shaped recess 19 formed by a double angular bend of the jaw member. The manner of gripping the flare by the jaws is clearly shown in Fig. 6 where the three points of contact are shown to be approximately one hundred and twenty degrees apart. The gripping faces of the jaws are flat and parallel with the tube so that a firm hold can be obtained, the jaws gripping the flare at a point approximately midway its length.

The lower end of the flare is pinched closed by oppositely-disposed jaws 20 disposed on the cross piece 6 of the frame of the head at a point under the flare-holding jaws 9, and these jaws 20 are disposed in chambers 21 formed in the cross piece 6 at opposite sides of the seat-receiving hole 11. The lower ends of the jaw members 22 are pivoted at 23 on the cross piece 6 so that the upper transverse portions 24 of the jaws can swing between the holding jaws 9 and cross piece 6, and pinch the melted flare from opposite sides to thus anchor the leading-in and filament anchor wires. The degree of compression of the melted flare is limited by spaced lugs 25 projecting from the face of one of the jaws to engage the face of the opposite jaw, the said lugs being spaced apart sufficiently to receive between them the flattened or compressed end of the flare. The pivots 23 pass through bosses 26 on the lower ends of the jaw members, and extending from the said members are lugs 27 to which are pivoted the upper ends of actuating rods 28. These rods move longitudinally upwardly and downwardly to cause the jaws to close and open, the parts being so disposed that the jaws will normally remain open by their own weight and attached parts. The lower ends of the rods 28 are pivoted at 29 to lugs 30 on a collar 31 which normally rests on the bottom cross piece 5 of the head frame, and which is secured to the upper end of a vertically reciprocatory lifter 32 in the form of a sleeve. The bottom cross piece 5 has a centrally-disposed depending tubular spindle 33 which is rotatably mounted in a bearing 34 on the arm 4 of the carrier 3, as shown in Figs. 2 and 3. Extending longitudinally of the lifter or actuator 32 is a rod-like holder 35 which has its upper end longitudinally bored at 36, Fig. 4, to receive the anchor wire $c$, and the upper extremity of this holder 35 is tapered into a point 37 so as to engage in the conical bore 16 of the flare seat 12 to thereby enter the said conical bore and direct the anchor wire $c$ into the lower end of the flare through the central opening 17 of the seat. The anchor wire holder or positioning member 35 has a stop collar 38 which normally rests on the collar 31 of the pinching jaw actuating means. The member 35, which has at its lower end a head or knob 39 to be engaged by a treadle mechanism hereinafter to be described, is normally held in its normal or lowered position, as shown in Figs. 2 and 3, by its own weight, and it is adapted to have an initial movement independently of the jaw-actuating means so that the anchoring wire can be first inserted into the lower end of the flare before the pinching jaws have completed the closing of the end of the flare, it being understood that the treadle mechanism forms a common actuator for the anchor wire placing device and the flare pinching or closing device.

The holding jaws 9 are adapted to be manually opened for permitting the flare or glass tube for the stem to be inserted or the completed stem removed, and for this purpose, the rock shafts 8 have their lower ends projecting below the bottom of the frame of the head and are equipped with levers 40 which have reversely-disposed handles 41 arranged at opposite sides of the cross piece 5, and these levers are connected for movement in unison by a connecting bar 42 so that the operator can open the jaws by pressing one or the other or both levers. Interposed between the handle 41 of one lever and the hub or spindle 33 of the cross piece 5 is a compression spring 43 which operates to hold the jaws closed under a yielding pressure. When either handle is pressed inwardly against this spring, the jaw-carrying rock shafts 8 will be rocked in a direction to move the jaws 9 apart, so that a flare can be inserted or the stem removed, and upon releasing the pressed handle 41, the jaws will automatically close. The heads are rotatably mounted in the carrier 3, and by providing a pair of handles 41, as shown, either handle is more likely to be disposed at the front where the operator can conveniently reach it, so that the turning of the head will be avoided and thus time saved. The connecting rod 42 is attached to corresponding arms, that is to say, arms projecting from the same side of the frame, and these arms of the levers are provided with pivots 43ª in the form of bolts which have apertured heads 44 through the apertures of which the ends of the connecting rod extend and the shank of each bolt passes through an opening 45, Figs 11 and 13, in each lever, and receives a nut 46, Fig. 2, to hold the pivot bolt in place. The connecting rod has one end 47 swiveled in the pivot bolt on one of the levers while its opposite end 48 is threaded in the pivot bolt on the other lever, and the rod has a non-circular portion 49 to be gripped by the fingers or a wrench for turning the rod so as to change the set of the levers and hence the position of the jaws 9 so that they can be centralized with respect to the seat 12 on which the flare is held by the jaws. If the jaws come to rest in such a position that the flare is too far to one side of the seat 12, the rod 42 will be turned in a direction to adjust the jaws to a position where the flare will be centrally disposed on the seat.

In order to rotate the stem-forming heads A, the spindle 33 of each head has secured thereto a friction wheel 50, and when the head carrier 3 is in a position to bring the heads opposite the burners H and H', friction driving wheels 51 will engage the wheels 50 of the two heads opposite the burners and rotate such heads continuously while the assembled parts of the stem are supported in the heating zones of the two heaters. These friction driving wheels 51 are secured on the upper end of vertical shafts 52 rotatably mounted in bearings 53 on the air and gas pipes 54 and 55 which supply the preliminary heater and the outer section of the final heater, said pipes being secured to the standard 1. The shafts 52 are continuously driven by a belt 56 which passes around pulleys 57 on the lower ends of the shafts and a pulley 58 on the continuously rotating main shaft 59 of the machine, which main shaft is driven in any suitable manner. The head-holding frame or carrier 3 has handles 60 projecting outwardly from the ends of the radial arms 4 so that the operator can conveniently turn the carrier for bringing the stem parts in the heads successively into coöperative relation with the flames.

As shown in Fig. 1, a treadle mechanism, designated generally by B, is arranged to operate the anchor wire placing element 35 of that holder which is opposite the final heater H'. This mechanism consists of a vertically-movable rod 61 having its upper end guided in a bearing block 62 carried by the air and gas pipes 54 and 55, and this rod, which carries a weight 63, is connected with one arm of a lever 64 fulcrumed on an outstanding arm 65 on the standard, and the other arm of the lever is connected by a link 66 with a treadle 67 which is fulcrumed at 68 on the floor adjacent the base of the standard. The upper end of the elevating device or rod 61 is formed into a head 69 or equivalent means which is directly under the knob 39 of the anchor wire placing device 35, so that when the rod 61 is raised, it will raise the device 35 and insert the anchor wire in the lower end of the flare which is softening under the influence of the heat of the flame. The weight 63 holds the rod 61 in lowered position with the head 69 thereof out of the path of the knob 39 of the approaching stem-forming head, and the weight also holds the treadle raised off the floor.

The attendant operating the machine is seated at the side diametrically opposite from the final heater and assembles the parts of the filament-holding stem in that head A which is nearest to her. In assembling these parts, the flare or glass tube is placed between the jaws 9 which are held open by pressing the levers 40, and as soon as the flare is placed on the seat 12, the levers are released so that the jaws will close on the flare and hold the same in central position on the seat, it, of course, being necessary to place the unflanged end of the flare downward so as to rest on the seat. After this is done, the leading-in wires b are inserted downwardly into the flare to engage their platinum tipped ends in the rockets 18 of the seat, as is shown in Fig. 2. The anchor wire c is next placed in the upper end of the rod or device 35, whereupon all the parts necessary for the stem are assembled. The head carrier 3 is then given a quarter turn to bring the head holding the parts for the first stem opposite the preliminary heater where the carrier will be held at rest, while the parts for the second stem are placed in the succeeding head. The carrier is then given another quarter turn to bring the heads holding the parts for the first and second stem opposite the final and preliminary heaters, respectively. At this time, the attendant must watch the heating of the flare in the final heater while she is at the same time assembling the parts for the third stem. About the time the parts of the third stem are assembled, the flare in the final heater will be in condition to be closed or pinched. In order to do this, she presses the treadle 67 which raises the rod 61 into engagement with the anchor wire placing device 35 and causes the latter to be moved upwardly a certain distance when the head 39 thereof engages the lower end of the actuating member 32. From this time, the parts 32 and 35 move together, with the result that the anchor wire c will be moved into the lower end of the fusing flare at the same time the jaws 20 are moved into engagement with the flare for compressing or pinching the same, and by this operation, the lower end of the flare will be flattened out, as shown at D, Fig. 15, to firmly hold the anchor and leading-in wires in place. As soon as this operation is completed, the attendant releases the treadle and at the same time turns the carrier 3 another step to bring the second head opposite the final burner, where the operation just described, is repeated. When the head containing the finished stem reaches a point in front of the operator, she presses the levers 40 to open the jaws 9 to permit the finished stem to be taken out, and in place of the finished stem, the parts for another stem are inserted. It will thus be seen that the various operations can be carried out with great despatch and without requiring any special skill on the part of the operator. When the treadle is released, all the parts lifted thereby, namely, the rod 61, the anchor wire placing device, and the stem-pinching or closing device, are returned to normal position by gravity so that no attention must be given thereto by the operator except to release the treadle.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, and desire to secure by Letters Patent, is:—

1. In a stem making machine, a rotatable frame, a seat thereon for the flare, and flare holding jaws mounted on said frame and each movable about an axis on the opposite side of the flare from the axis of the other jaw, the two jaws being directed one toward the other into overlapping relation and shaped at their overlapping ends to grasp the flare.

2. In a stem-making machine, the combination of a rotary structure, and a centrally-disposed flare support thereon, with a pair of flare holding jaws mounted at opposite sides of the rotary structure and extending inward past the flare support, one of the jaws being flat and the other being provided with an angular recess or seat opposite the flat portion of the first-mentioned jaw to provide a three-point contact between the jaws and a flare on the flare support.

3. In a machine of the class described, the combination of a rotary structure, vertically-disposed rock shafts mounted thereon, oppositely-disposed flare-holding jaws carried by the rock shafts, and means for opening and closing the jaws.

4. In a machine of the class described, the combination of a rotary structure, vertically-disposed rock shafts mounted thereon, oppositely-disposed flare-holding jaws carried by the rock shafts, and means for opening and closing the jaws, one of the jaws being shaped to have a single point contact with the flare and the other jaw being shaped to have a two-part contact with the flare.

5. In a stem-making machine, the combination of a rotary frame, vertically-disposed rock shafts mounted thereon, horizontally-disposed flare-engaging jaws arranged above the frame and connected with the upper ends of the rock shafts and having their inner ends overlapping, said jaws being so shaped as to engage the flare at three spaced points.

6. In a stem-making machine, the combination of a rotary frame, vertically-disposed rock shafts mounted on the sides of the frame, horizontally-disposed inwardly-extending overlapping flare-engaging jaws secured to the rock shafts, and means connected with the shafts for rocking the same to open and close the jaws.

7. In a stem-making machine, the combination of a rotary frame, vertically-disposed rock shafts mounted thereon, flare-engaging means carried by the rock shafts, and oppositely-disposed connected actuating levers connected with the shafts for rocking the same to open and close the jaws.

8. In a stem-making machine, the combination of a rotary frame, rock shafts mounted thereon, flare-engaging jaws carried by the shafts, and connected actuating devices mounted to rotate with the frame and operating through the shafts to open and close the jaws.

9. In a stem-making machine, the combination of a rotary frame, flare-engaging jaws mounted thereon, and oppositely-disposed connected levers rotating with the frame and operatively connected with the jaws for opening and closing the same.

10. In a stem-making machine, the combination of a rotary frame, overlapping flare-engaging jaws shaped to have a three-point contact with the flare, and connected devices disposed at opposite sides of the frame and connected with the jaws whereby both jaws can be opened by operating either device.

11. In a stem-making machine, the combination of a rotary frame, flare-holding means mounted thereon, oppositely-disposed levers connected with the said means and rotating with the frame for opening and closing the means, and an adjustable connection between the levers whereby they operate together.

12. In a stem-making machine, the combination with a rotary structure, of a flare-holding means thereon consisting of oppositely-moving members, an actuator connected with each member, and a connecting element between the actuators for operating both members by either actuator.

13. In a stem-making machine, the combination with a rotary structure, of a flare-holding means thereon consisting of oppositely-moving members, an actuator connected with each member, a connecting element between the actuators for operating both members by either actuator, and a yielding device on one of the actuators to hold the said means closed.

14. In a stem-making machine, a pair of co-acting flare holding jaws, an anchor-wire placing device, and changing means for the jaws to establish at will coincidence between the center line of the jaws and the axis of movement of the anchor-wire placing device.

15. In a stem-making machine, a pair of flare-holding jaws movable to and from each other, an anchor-wire placing device movable through a predetermined path perpendicular to the movement of the jaws, and adjustable connecting means acting on the jaws for varying at will the movements of said jaws one relative to the other to establish coincidence between the center line of the jaws and the axis of movement of the anchor-wire placing device.

16. In a stem-making machine, the combination of a rotary frame, flare-holding means mounted thereon including jaw members, actuators connected with the jaw members, a device arranged centrally in the rotary frame for positioning an anchor wire in the flare, a connecting element between the actuators whereby the latter operate together, and an adjustable means between the element and one of the actuators for shifting the position of the said members to hold the flare in alinement with the said device.

17. In a stem-making machine, the combination of a rotary frame, swinging jaw members mounted thereon for holding a flare, an anchor wire placing device disposed in coöperative relation with the jaw members, an element operatively connecting the members to swing together, and a device for causing the jaw members to open and close simultaneously and serving to adjust the position of the jaw members to hold the flare in alinement with the said device.

18. In a stem-making machine, the combination of a rotary frame, rock shafts mounted thereon, swinging jaws connected with the rock shafts to form a flare-holding means, an anchor wire placing device disposed in coöperative relation with the jaws, levers connected with the rock shafts, and a link having a swivel connection with one lever and an adjustable connection with the other for providing for simultaneous movement of the jaws and the adjustment thereof with respect to the anchor wire placing device.

19. In a stem-making machine, the combination of a rotary frame, rock shafts mounted thereon, flare-holding jaws mounted on the rock shafts, an anchor wire placing device mounted in coöperative relation with the jaws, operating levers connected with the shafts, a connecting rod between the levers, a member pivoted on each lever, a swivel connection between one of the members and rod, and an adjustable connection between the rod and other member.

20. In a stem-making machine, the combination of a rotary frame, rock shafts mounted thereon, flare-holding jaws mounted on the rock shafts, an anchor wire placing device mounted in coöperative relation with the jaws, operating levers connected with the shafts, a connecting rod between the levers, a pivot mounted on each lever, a swivel connection between one of the pivots and rod, an adjustable connection between the rod and the other pivot, and means mounted on the frame for closing the flare around the anchor and leading-in wires.

21. In a stem-making machine, the combination of a rotary frame having tubular standards, rock shafts mounted in the standards, flare-holding jaws secured to the upper ends of the rock shafts, oppositely-disposed actuating levers secured to the lower ends of the shafts, a connection between the levers whereby they operate together, and a yielding means pressing on one of the levers to hold the jaws closed.

22. In a stem-making machine, the combination of a rotary head frame having tubular standards, rock shafts mounted in the standards, flare-holding jaws connected with the upper ends of the rock shafts, levers secured to the lower ends of the rock shafts having oppositely-disposed handles, pivots mounted on the levers, a connecting rod having one end swiveled in one of the pivots and the other end threaded in the other pivot, and means for yieldingly holding the jaws in closed position.

23. In a stem-making machine, the combination of a rotary support, an anchor wire placing device disposed centrally therein, a flare seat immediately over said device and having a bore receiving the end of the latter, flare holding means mounted on the support and consisting of oppositely extending over-lapping members shaped to engage the flare at three spaced points above the seat, and means for adjusting the position of the flare-holding means to support the flare in alinement with said anchor wire placing device.

24. In a stem-making machine, the combination of a rotary support, an anchor wire placing device disposed centrally therein, a flare seat immediately over said device and having a bore receiving the end of the latter, flare holding means mounted on the support and consisting of oppositely extending over-lapping members shaped to engage the flare at three spaced points, means for adjusting the position of said members to support the flare on the seat in alinement with the said anchor wire placing device, and means on the rotary support for closing the end of the flare and sealing the leading-in and anchor wires in place.

25. In a stem-making machine, the combination of a frame consisting of upper and lower cross pieces and tubular standards connecting the cross pieces, rock shafts mounted in the standards, flare-holding jaws connected with the rock shafts, levers connected with the lower ends of the rock shafts, a spring interposed between one of the levers and one of the cross pieces of the frame, and a connecting device between the levers whereby the spring operates to hold the jaws in closed position.

26. In a stem-making machine, the combination of a frame consisting of upper and lower cross pieces and tubular standards, rock shafts journaled in the standards, flare-engaging jaws connected with the rock shafts and shaped to engage the flare at three spaced points, a flare seat on the upper cross piece of the frame and having means for receiving the leading-in wires, and a device mounted on the frame for placing an anchor wire in the flare.

27. In a stem-making machine, the combination of a frame consisting of upper and lower cross pieces and tubular standards, rock shafts mounted in the standards, flare-engaging jaws connected with the rock shafts and shaped to engage the flare at three spaced points, a flare seat on the upper cross piece of the frame and having means for receiving the leading-in wires, a device mounted on the frame for placing an anchor wire in the flare, separately pivoted pinching jaws mounted on the top cross piece of the frame, and means for actuating the last-mentioned jaws.

28. In a stem-making machine, the combination of a frame consisting of upper and lower cross pieces and tubular standards, rock shafts mounted in the standards, flare-engaging jaws connected with the rock shafts and shaped to engage the flare at three spaced points, a flare seat on the upper cross piece of the frame and having means for receiving the leading-in wires, a device mounted on the frame for placing an anchor wire in the flare, separately pivoted pinching jaws mounted on the top cross piece of the frame, means for actuating the last-mentioned jaws, and means connected with the rock shafts for actuating the same and for adjusting the position of the flare-holding jaws with respect to the said seat.

29. In a stem-making machine, the combination of a support, a rotary frame mounted thereon, flare-holding jaws on the upper end of the frame, actuating devices at the lower end of the frame, connecting means between the devices and jaws, and means connecting the devices together whereby either device can open the jaws, said means and devices being located above the support to rotate with the frame.

30. In a stem-making machine, the combination of a support, a rotary frame mounted thereon, flare-holding jaws on the upper end of the frame, actuating devices at the lower end of the frame, connecting means between the devices and jaws, means connecting the devices together whereby either device can open the jaws, said means and devices being located above the support to rotate with the frame, and means disposed under the support and connected with the frame for rotating the same.

31. In a stem-making machine, the combination of a rotary frame having a top cross piece provided with a central opening and chambers at opposite sides of the opening, a flare seat in the form of a plug disposed in the opening, pinching jaws disposed in the chambers and pivotally connected with the cross piece, said jaws having transverse members forming jaw faces for gripping the flare, operating links disposed under the cross piece and having their upper ends pivotally connected with the jaws at points between their pivots and jaw faces, and actuating means connected with the links and arranged to cause the jaws to gravitate to open position.

32. In a stem-making machine, a standard, a carrier mounted thereon, heads on the carrier for the stem parts, preliminary and final heaters, air and gas pipes for the heaters secured to the column for supporting the heaters thereon, driving devices mounted on the said pipes for rotating the heads, each head including flare-closing and anchor wire placing devices, and an actuator mounted on the supply pipes for the final heater for operating the devices of that head disposed in coöperative relation with the final heater.

33. In a stem-making machine, the combination of a supporting column, a rotary carrier mounted thereon, rotary heads on the carrier for the stem parts, a heater, means for supporting the heater on the column, a driving device mounted on the said supporting means for rotating each head as it moves into coöperative relation with the heater, each head including anchor wire placing and flare-closing devices depending from the head, a lift element mounted on the said heater supporting means and normally disposed below the wire-placing and flare-closing devices, and element for actuating the lift means to operate the said devices of the head disposed in coöperative relation with the heater.

34. In a stem-making machine, the combination of a supporting column, a rotary carrier mounted thereon, rotary heads on the carrier for the stem parts, a heater, means for supporting the heater on the column, a driving device mounted on the said supporting means for rotating each head as it moves into coöperative relation with the heater, each head including anchor wire placing and flare-closing devices depending from the head, a lift element mounted on the said heater supporting means and normally disposed below the devices, element for actuating the lift means to operate the said devices of the head disposed in coöperative relation with the heater, a lever supported on the column and connected with the element, and a treadle device for actuating the lever.

35. In a stem-making machine, the combination of a supporting column, a rotary carrier mounted thereon, rotary heads on the carrier for the stem parts, a heater, means for supporting the heater on the column, a driving device mounted on the said supporting means for rotating each head as it moves into coöperative relation with the heater, each head including anchor wire placing and flare-closing devices depending from the head, a vertically movable lifting element having its upper end guided on the said supporting means, a weight connected with the element, a lever hingedly connected with the element, means for fulcruming the lever on the column, a treadle connected with the lever, and a stop device for holding the carrier stationary while any head is disposed in coöperative relation with the heater and is rotated by the said driving device and while the elevating element is actuated by the treadle.

In testimony that I claim the foregoing as my own, I have hereto affixed my signature in the presence of two witnesses.

MOSES E. PIERSON.

Witnesses:
EDDA HORNING,
KATHRYN WELSH.